US011061810B2

(12) United States Patent
Campbell et al.

(10) Patent No.: US 11,061,810 B2
(45) Date of Patent: Jul. 13, 2021

(54) VIRTUAL CACHE MECHANISM FOR PROGRAM BREAK POINT REGISTER EXCEPTION HANDLING

(71) Applicant: International Business Machines Corporation, Armonk, NY (US)

(72) Inventors: David Campbell, Austin, TX (US); Dwain A. Hicks, Pflugerville, TX (US); David A. Hrusecky, Cedar Park, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/281,181

(22) Filed: Feb. 21, 2019

(65) Prior Publication Data
US 2020/0272557 A1   Aug. 27, 2020

(51) Int. Cl.
*G06F 12/00* (2006.01)
*G06F 11/36* (2006.01)
*G06F 12/1009* (2016.01)

(52) U.S. Cl.
CPC ...... *G06F 11/3648* (2013.01); *G06F 12/1009* (2013.01)

(58) Field of Classification Search
CPC .................. G06F 11/3648; G06F 12/1009
See application file for complete search history.

(56) References Cited

U.S. PATENT DOCUMENTS

| 5,664,159 A * | 9/1997 | Richter .............. G06F 11/3648 703/23 |
| 6,789,181 B1 * | 9/2004 | Yates ................. G06F 9/45533 712/4 |
| 2002/0156962 A1 * | 10/2002 | Chopra ................ G06F 9/3004 711/3 |
| 2011/0047314 A1 * | 2/2011 | Pogor ................ G06F 11/3648 711/3 |
| 2018/0060215 A1 | 3/2018 | Mola |
| 2018/0181480 A1 | 6/2018 | Dracea et al. |
| 2018/0203780 A1 * | 7/2018 | Mola .................. G06F 12/0804 |

* cited by examiner

*Primary Examiner* — Arvind Talukdar
(74) *Attorney, Agent, or Firm* — Scully, Scott, Murphy & Presser, P.C.

(57) ABSTRACT

A system and method of stopping program execution includes tagging an entry in a virtual cache with an indicator bit where the virtual address of the entry corresponds to a virtual address range in a break point register, in response to a second virtual cache data access demand matching the entry tagged with the indicator bit, determining whether the second data access demand matches the virtual address range of the breakpoint register, and in response to the second data access demand matching the virtual address range of the break point register, flagging an exception and stopping execution of the program. In an embodiment, the method or system enters a slow-mode in response to the second data access demand matching the virtual cache entry with the indicator bit, and performs a full comparison between the second data access demand and the break point register virtual address range.

18 Claims, 5 Drawing Sheets

VIRTUAL CACHE MECHANISM FOR PROGRAM BREAK POINT REGISTER EXCEPTION HANDLING

BACKGROUND

The disclosure herein relates generally to information handling and/or data processing systems, and more particularly, to methods, apparatuses, and systems for handling data in processors, including the use of a virtual cache as part of a trigger mechanism to stop a program's execution.

Modern information and data handling systems often include processors that include a set of data processing circuitry or hardware units. The circuitry and hardware units are typically connected in series and include a number of stages. For example, an "instruction fetch" stage where an instruction is fetched from memory and a "decode" stage, where the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue (ISQ) typically is issued to an execution unit in an "execution" stage where the operation as specified by the instruction is executed. Executing an operation specified by an instruction typically includes accepting data, e.g., one or more operands, and producing one or more results. There are usually registers, caches, and queues to hold data, information and/or instructions for the hardware units.

Among other tasks, memory management manages the data stored in a computer including overseeing the retrieval and storage of data from memory in a computer. Computer systems often include physical memory used to store applications and data. Modern computers typically rely on a memory management technique known as virtual memory management to increase performance and provide greater flexibility in computers and the underlying architectural designs upon which they are premised. Virtual memory management systems can include a hypervisor or virtual machine monitor (VVM), which is computer software, firmware, or hardware that creates and runs multiple virtual machines as guests on a computer where computing resources such as memory and processing capability are shared. Computer programs typically access the memory system using addresses pointing to locations in the virtual memory space. In virtualized systems, virtual caches are used where the virtual cache directory is tagged with virtualized addresses instead of physical addresses. The physical memory devices in the computer, however, are accessed via "real" addresses that map directly into specific memory locations in physical memory devices. Hardware and/or software in the computer are provided to perform "address translation" to map the real memory addresses of the physical memory to virtualized addresses in the virtual memory space.

In certain processor architectures, there are various control registers that the software can set-up to stop program execution. These mechanisms to stop program execution, referred to as break point mechanisms, are useful as a program debugging aid.

SUMMARY

The summary of the disclosure is given to aid understanding of a computer system, computer architectural structure, processor, virtual caches, and method of using virtual caches, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, virtual cache and their method of operation to achieve different effects.

According to an embodiment a method of stopping program execution by a processing system is disclosed. The method in one or more embodiments includes tagging an entry in a virtual cache with an indicator bit where the virtual address of the entry corresponds to a virtual address range in a break point register; in response to a second virtual cache data access demand matching the entry tagged with the indicator bit, determining whether the second data access demand matches the virtual address range in the breakpoint register; and in response to the second data access demand matching the virtual address range in the break point register, flagging an exception and stopping execution of the program. The method includes in an aspect making a first data access demand to the virtual cache with the virtual address range in the break point register, loading the virtual address corresponding to the virtual address range in the break point register into the tagged entry in the virtual cache, performing a comparison to determine whether the virtual address of the first data access demand matches the virtual address range in the break point register, and in response to the virtual address of the first data access demand matching the virtual address range in the break point register, tagging the indicator bit for that virtual cache entry. In one or more embodiments, the method further includes in response to the second data access demand matching the virtual cache entry with the indicator bit, the second data access demand enters a slow-mode, and a full comparison between the second data access demand and the virtual address range in the point break register is performed in the slow mode.

In addition, in one or more embodiments, a computing system is disclosed where the system has a virtual cache having a plurality of entries having a virtually tagged address and associated data, and a processor, where the system is configured to: tag one of the entries in the virtual cache with an indicator bit in response to the virtual address of the entry corresponding to a virtual address range in a break point register; in response to a second virtual cache data access demand matching the entry tagged with the indicator bit, determine whether the second data access demand matches the virtual address range in the breakpoint register; and in response to the second data access demand matching the virtual address range in the break point register, flag an exception and stop the execution of the program.

The system in one or more embodiments is further configured to load the virtual address corresponding to the virtual address range in the break point register into an entry in the virtual cache and perform a comparison to determine whether the virtual address of the first data access demand matches the virtual address range in the break point register, and in response to the first data access demand matching the virtual address range in the break point register, tag the indicator bit for that virtual cache entry. In an aspect, the system is further configured to enter a slow-mode in response to the second data access demand matching the virtual cache entry with the indicator bit and perform a full comparison between the second data access demand and the virtual address range in the break point register while in the slow mode.

In yet another embodiment a computing system is disclosed that includes a virtual cache having a plurality of entries, wherein each entry has a virtually tagged address and associated data, a processor, and a non-transitory computer-readable storage medium comprising program instructions that when executed by the processor cause the processor to: tag one of the entries in the virtual cache with an indicator bit in response to the virtual address of the entry corresponding to the virtual address range in a break point register; in response to a second virtual cache data access demand matching the entry tagged with the indicator bit, determine whether the second data access demand matches the virtual address range in the breakpoint register; and in response to the second data access demand matching the virtual address range of the break point register, flag an exception and stop the execution of the program. In one or more embodiments, the programing instructions when executed by a processor further cause the processor to: load the virtual address corresponding to the virtual address range in the break point register into an entry in the virtual cache; perform a comparison to determine whether the virtual address of the first data access demand matches the virtual address range in the break point register, and in response to the first data access demand matching the virtual address range in the break point register, tagging the indicator bit for that virtual cache entry; enter a slow mode in response to the second data access demand matching the virtual cache entry with the indicator bit; and perform a full comparison between the second data access demand and the virtual address range in the break point register while in the slow mode.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, virtual caches, and their method of operation will be better understood when read in conjunction with the figures provided. Embodiments are provided in the figures for the purpose of illustrating aspects, features, and/or various embodiments of the computer system, computer architectural structure, processors, virtual caches, and their method of operation, but the claims should not be limited to the precise arrangement, structures, features, aspects, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

Figure 1:
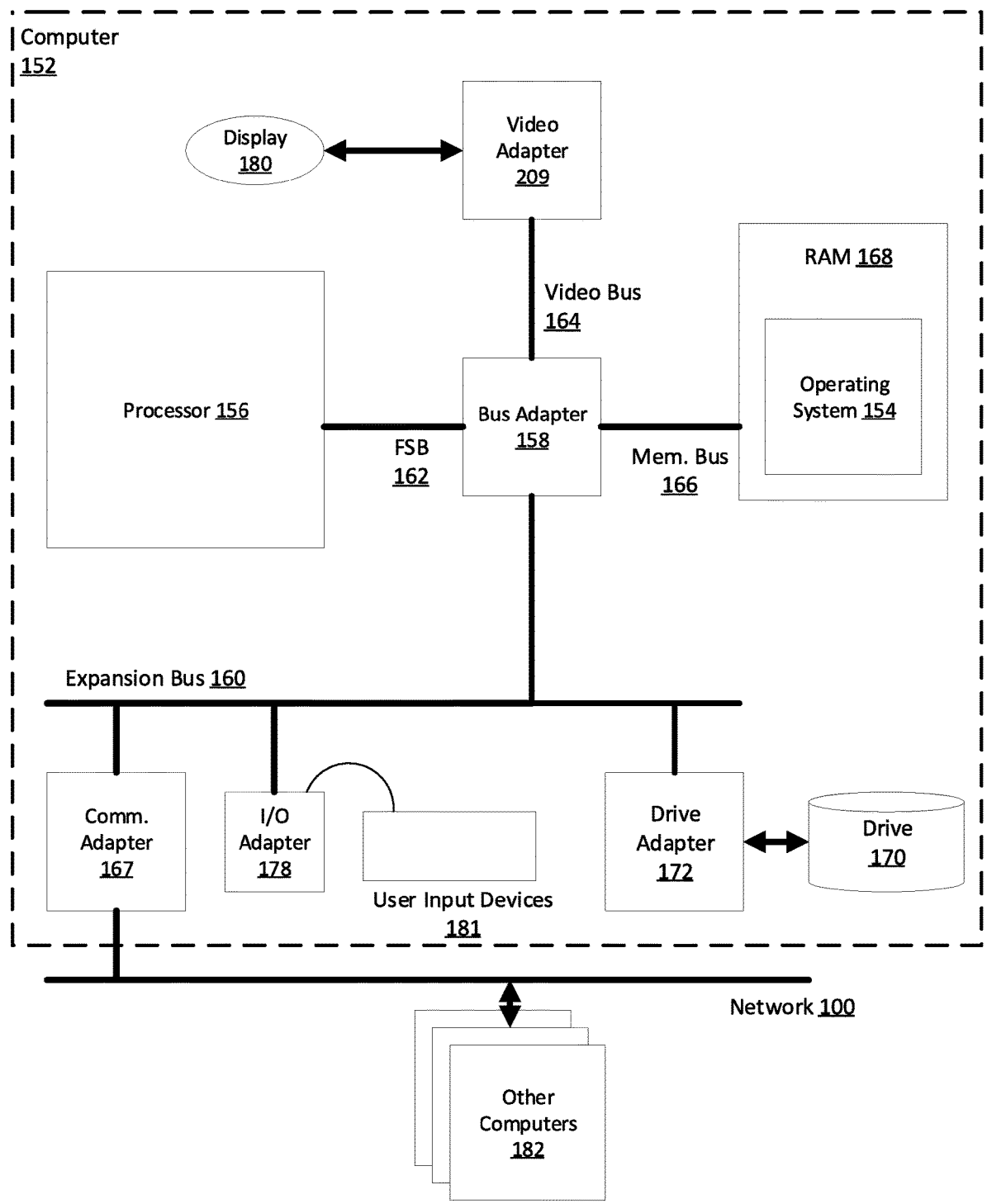
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, caches, and their method of operation, however, it will be understood by those skilled in the art that different and numerous embodiments of the computer system, computer architectural structure, processor, caches, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors and microprocessor systems and architectures, as well as address translation techniques and systems, which should be apparent to those skilled in the art. It is assumed that those skilled in the art are familiar with the general architecture of processors, and in particular with address translation techniques and systems, and their operation. It may be noted that a numbered element is numbered according to the figure in which the element is introduced, and is typically referred to by that number throughout succeeding figures.

Modern computer systems including systems using virtualized memory management can include a hypervisor or virtual machine monitor (VVM), which is computer software, firmware, or hardware that creates and runs multiple virtual machines as guests on a computer where computing resources such as memory and processing capability are shared. In a system with virtual memory, the processor issues and uses virtual memory addresses. In virtualized systems, the system typically uses virtual caches in the microprocessor where the virtual cache directory is tagged with the virtualized address instead of the physical address.

In certain processor architectures, there are various control registers that the software can setup to stop program execution, e.g., interrupt the process, when a data access matches the parameter of the control register contents. These control registers are sometimes referred to as break point registers. In most modern computer systems multiple threads will be handled, each having their own distinct Special Purpose Registers (SPRs), of which a Program Break Point Register is one of them. A thread may employ multiple Break Point Registers to aid program monitoring. Thus, it is not uncommon to have 4, 8, or more Break Point Registers actively monitoring demand load and store operations simultaneously. The contents of this control/break point register are a virtual address and an address range offset such that when the program accesses the data within this virtual address range, an exception is triggered to stop execution of the program. The exception typically will then be used as a program debug aid. The debug aid is an advantageous feature for software. Using a control register as a point break mechanism is relatively fast compared to software related point break mechanisms. This mechanism, however, puts considerable strain and load on the critical path of the processor's pipeline as once the address of the data access is known, a large address compare is performed which must be fast enough to block the write back of the data access to the processor's register file. Performing this compare in enough time hurts the processor's performance, particularly its load to use latency.

Disclosed are techniques and systems to use in a virtually tagged cache as a part of a break point or interrupt mechanism. In one or more embodiments, a mechanism is deployed to exploit the reuse of the virtual cache hit comparators. In one or more embodiments, a virtual cache is enabled or set-up with certain data and the virtual cache comparators are used as part of the process of determining a break point register match. In one or more embodiments, a virtually tagged cache is tagged with an indicator bit or bit field, preferably a single indicator bit, to identify a match or partial match between the virtual address in the virtual cache and the virtual address range in the break point register. In an embodiment, when the indicator bit is set in the virtual cache for a particular cache line, later access to that cache line will send the program execution into a slow mode to fully process and compare the access to the virtual cache to the virtual address in the break point register in its entirety. The indicator bit can also indicate that the executing data access should not write back to the register. That is, presence of the indicator bit also prevents write-back to the register. Using the virtual cache and the virtual cache comparators to slow program execution on a partial match of the break point register relieves processor critical path load, and has negligble effects on processor performance.

Control registers, break point mechanisms, and virtual caches are typically used in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include computers, servers, routers, smart phones, personal assistants other electronic devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
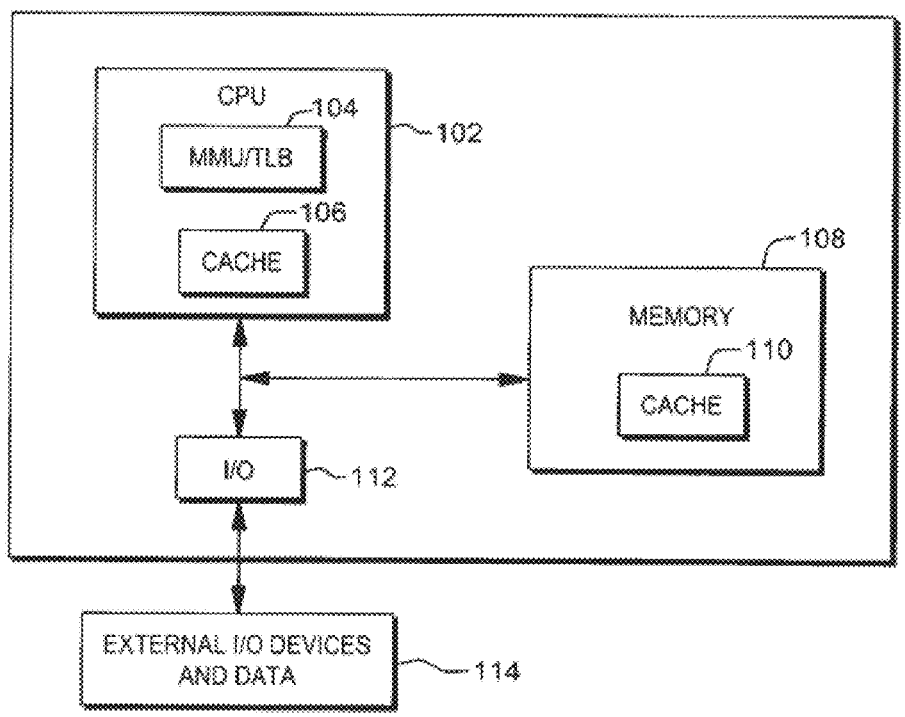
FIG. 2A depicts an example of a computing environment.

One example of a computing environment to incorporate and use one or more control registers, break point mechanisms, and virtual caches is described with reference to FIG. 2A. In one example, a computing environment 150 includes a processor (central processing unit —CPU) 102 that includes at least a cache 106 and at least one memory management unit (MMU) having a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. Cache 106 may be a virtual cache having a virtual cache directory tagged with virtual addresses instead of real or physical addresses. In an embodiment, to improve address translation, the memory management unit (MMU) 104 can utilize a translation buffer, more specifically a translation look-aside buffer (TLB). The translation buffer or TLB is a cache of previously translated addresses. Thus, when a request is received for a memory access that includes an address to be translated, typically the translation buffer or TLB is checked first. If the address is cached in the translation buffer or TLB, then the address is provided to the processor. Otherwise, the received address is translated using one of any number of translation techniques.

Figure 2C:
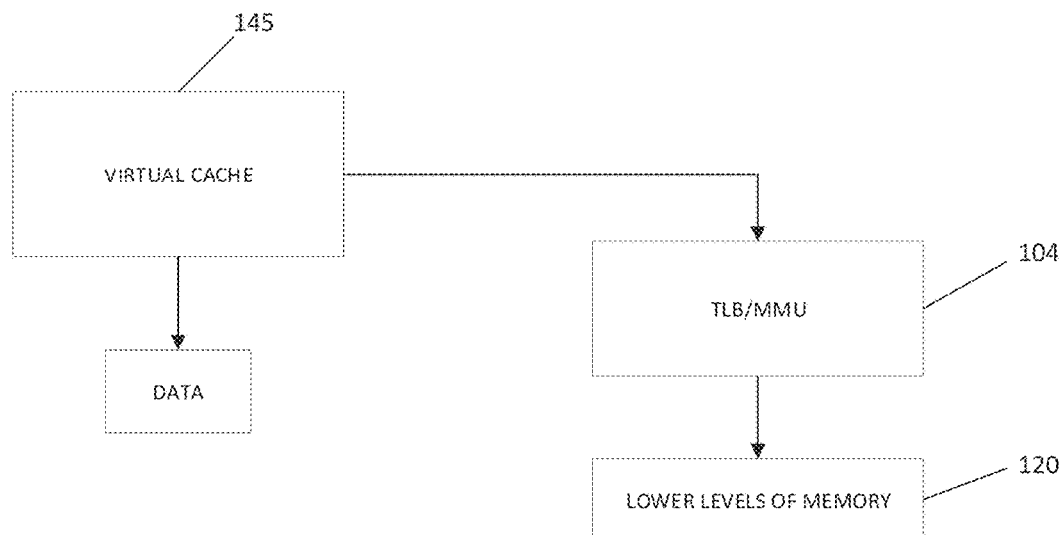
FIG. 2C depicts an example of a virtual cache in a computing environment.
Figure 2B:
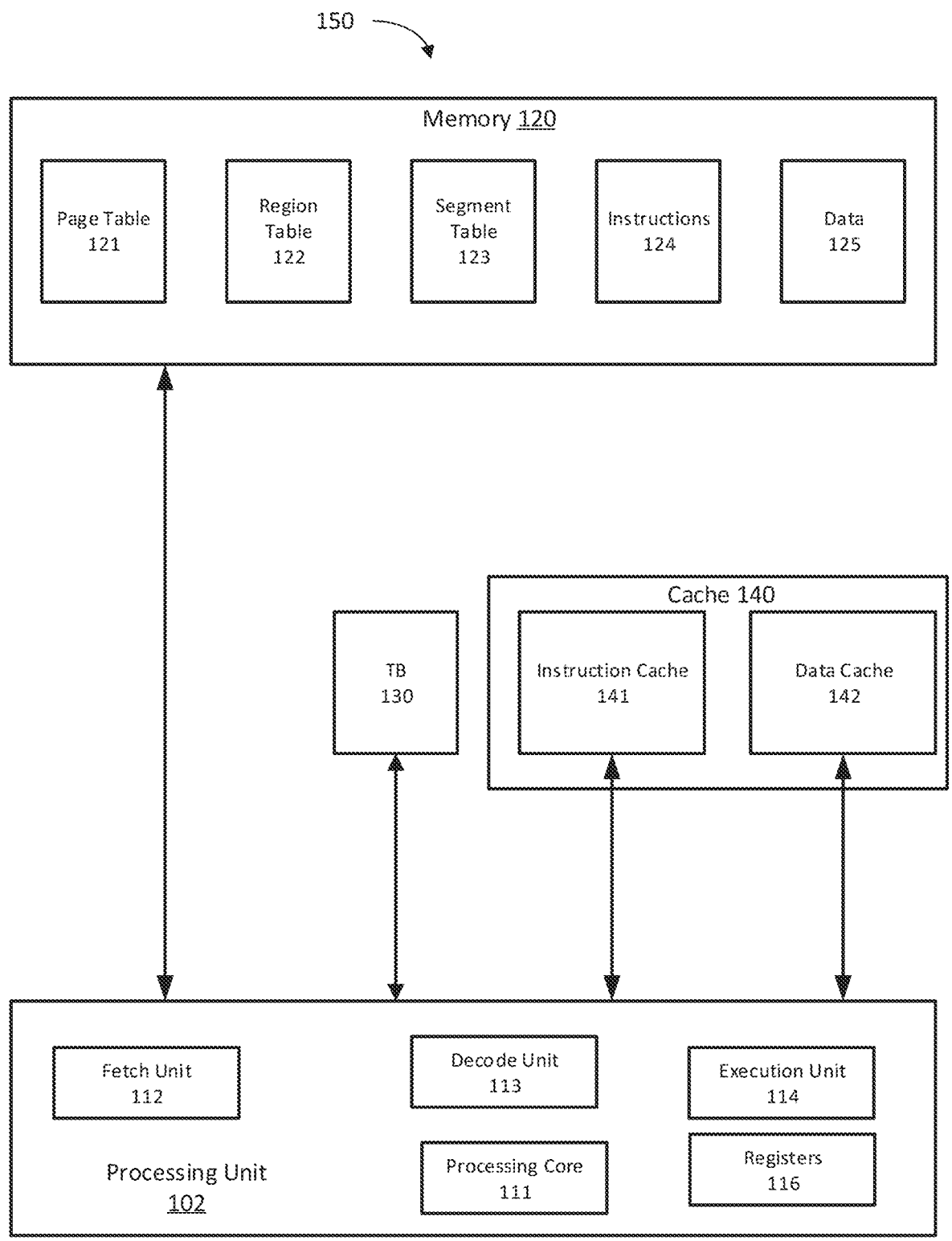
FIG. 2B depicts another example of a computing environment.

FIG. 2B illustrates a block diagram of an embodiment of a processing system 150. The processing system 150 includes a processing unit 102, system memory 120, a translation buffer 130, and cache memory 140. Cache memory 140 includes instruction cache 141 and data cache 142, which store instructions and data, respectively, for quick access by the processing unit 102 during execution of instructions. Cache memory 140 in an embodiment includes virtual data caches 142.

The processing unit 102 receives data, such as operand data and instructions, and executes the instructions. The processing unit 102 may include, for example, a processing core 111 having logic and other circuitry for processing data and instructions, including a fetch unit 112 configured to fetch instructions, a decode unit 113 configured to decode instructions, and an execution unit 114 configured to execute the instructions. Processing unit 102 may also include registers 116, including control registers. Although a few functional units of the processing unit 102 are illustrated for purposes of description, it is understood that the processing unit 102 may include additional functional units for retrieving, processing, and storing instructions and data.

Processing system 150 further includes system memory 120 configured to store instructions 124 and data 125 which may be accessed and manipulated by the instructions 124. The memory 120 can include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processing unit 102. In this disclosure, the terms physical memory, real memory, system memory and absolute memory are used interchangeably to refer to the main storage accessible to a physical processor.

Address translation in a virtual memory system typically incorporates accessing various address translation data structures. Memory 120 includes dynamic address translation structures, such as a page table 121, region table 122, and segment table 123. Page table 121 includes multiple page table (PTEs) entries that map virtual addresses to real addresses on a page-by-page basis. Likewise, for handling segmentation, segment table 123 includes entries that map effective addresses to virtual addresses on a segment-by-segment basis. Translation buffer (TB) 130 is a data structure used for storing some of the address mappings by caching entries (PTEs) from page table 121 located in memory 120. In the embodiment of FIG. 2B, TB 130 stores mappings from virtual memory addresses (VA) to physical memory or real addresses (RA).

In the embodiment of FIG. 2B, in operation, the fetch unit 112 fetches an instruction from memory 120 or from the instruction cache 141. The decode unit 113 reads the instruction and typically determines or identifies one or more virtualized addresses referenced by the instruction. The processor or decode unit 113 may access the virtual cache 140, to access the data referred to by the virtualized address. In virtualized systems, virtual caches are used where the virtual cache directory is tagged with the virtualized address instead of the physical address. A virtual cache will compare the virtual address of a data access down to the cache line. If the virtual address/tag is in the virtual cache directory then the virtual cache hits and the data is read/written.

If the virtual address access misses in the virtual cache, then the data access demand is sent to memory. When the data access demand is sent to memory typically the virtual address needs to be translated to a real or physical address. The data corresponding to the data access is retrieved from memory 120 and reloaded into the cache 140, and the virtual cache directory is updated.

Virtual addresses are often partitioned for the purposes of address translation into offset bits and effective address bits, with the offset bits pointing to a specific address in a page. The effective address bits or the effective page number (EPN) may include tag bits and set-index bits. TB entries generally only map a certain number of bits from a virtual address to a corresponding number of bits in a physical address. The number of bits mapped is a function of the page size associated with the virtual address. For example, for a 4 KB page size, the first 12 bits of the physical address represent offset bits within a page, because 12 bits are sufficient to address every memory location within a 4 KB page. In another example, for a 1 GB page size, the first 30 bits of the physical address represent offset bits within a page, and the remaining 34 bits would be effective address bits.

The decode unit 113 may access TB 130 for address translation, e.g., virtual-to-real address translation. If the virtualized address is included as an entry in the TB, the real address (RA) is provided to the CPU, along with any additional information in the entry, such as data access information, page size, etc., and the system can proceed to use the corresponding physical memory address received from the TB to locate the data from memory 120.

FIG. 2C illustrates a block diagram of another embodiment of a processing system 150. The processing system 150 includes a processing unit 102 (not shown), memory 120, a translation look-aside buffer (TLB/MMU) 104, and virtual cache memory 145. Accesses to virtual cache 145 are made using virtual addresses and if the virtual cache hits, e.g., there is a match in the virtual cache 145, then the referenced (mapped) data is supplied. If there is a miss in the virtual cache, the virtual address is sent to the TLB/MMU 104 for translation to a real address (RA), and the access is sent to memory 120 to retrieve the data.

In certain processor architectures, there are various control registers that the software can setup to stop or interrupt program execution when a program accesses the data within the virtual address range of the control register. These control registers are referred to as break point registers. In modern computer systems that handle multiple threads there are often multiple break point registers running to actively monitor demand load and store simultaneously and to aid program monitoring. The control/break point register contains a virtual address and an address range offset such that when a program accesses the data within this address range, an exception is triggered to stop the program from executing. The exception typically will then be advantageously used as a program debug aid. The control register acting as a break point is advantageous because it provides a relatively fast program break point mechanism. This break point mechanism, however, puts considerable strain on the critical path of the processor's pipeline as once the address of the data access is known, a large address compare is performed which must be fast enough to block the write-back of the data access to the processor's register file. Performing this compare in enough time uses a lot of the processor's resources and hurts the processor's performance.

Disclosed are techniques and systems to use a virtually tagged cache as a part of a break point mechanism. As will be appreciated, multiple threads may be run in a computer systems and each thread may have a break point mechanism, and further there may be multiple break point mechanism per thread to aid in program monitoring. In one or more embodiments, the virtual cache and the virtual bit comparators of the virtual cache are used to do a partial or preliminary compare with the contents, e.g., the virtual address, within the break point register(s). In one or more embodiments, the virtual cache comparators are used as part of the process of determining a break point register match. Since the cache hit comparison performed in a virtual cache is almost the same as a break point register compare, in an embodiment the virtual cache comparators are used to reduce the load on the critical path of the processor. The problem of the large address comparisons being performed in the critical path of the processor is overcome when a virtually tagged cache is used in one or more embodiments as described.

A virtually tagged cache compares the virtual address of a data access down to the cache line granularity, however, a break point register typically can go down to a smaller granularity than a single cache line. As such, a full comparison of the virtual tag in the virtual cache e.g., data cache 142, will not fully resolve whether there is a full break point register match, so additional processing is required. In one or more embodiments, the virtual cache will be tagged with a bit field, preferably a single indicator bit, that indicates a partial match between the data access to the virtual cache with the contents of the break point register(s). Whenever this indicator bit is set in a virtual cache for a particular cache line, an access to that cache line in the virtual cache will send program execution into a slow mode to fully process whether there is one or more break point register matches in their entirety. Program execution entering this slower mode to fully process whether there is a break point register match is undertaken only for accesses to the specially tagged cache line in the virtual cache. Using the virtual cache and the virtual cache comparators to slow the program execution on a break point register partial match relieves processor critical path load, and has negligible effects on processor performance The indicator bit can also be used to prevent the executing data access from writing back to the register. The benefit of this mechanism is that a single, pre-processed bit can indicate that the executing data access should not be written back to a register, e.g., a general purpose register, and place executing the data access demand into a slow mode to have enough time to process the full break point register compare. Using the virtual cache comparators and a single bit to indicate a break point partial match relieves pressure on the critical path of the processor, and processor performance loss is negligible.

The process for setting up, enabling, and/or tagging the virtual cache with the indicator bit includes enabling the breakpoint register by attempting to access the virtual cache by sending a data access demand to the virtual cache having a virtual address with the virtual address range in the break point register. Since the virtual address range in the break point register does not exist in the virtual cache, a normal virtual cache miss will occur. The virtual cache will resolve the miss by sending the executing data access demand to memory to bring the cache line into an entry within the virtual cache. Upon loading the cache line into an entry in the virtual cache (which is outside the processor's critical path), a compare is performed on the new cache line's virtual tag, e.g., the new tagged entry in the virtual cache (virtual address tag of data access demand) and the virtual address range in the breakpoint register(s). If the compare results are valid, e.g., there is a match, the indicator bit for that cache line is set in the entry in the virtual cache.

The specially tagged virtual cache operates to detect one or more break point register exceptions by utilizing its comparators to detect a cache line or virtual cache entry hit. After the virtual cache is set up, e.g., a virtual cache entry is tagged with indicator bit identifying where the virtual address in the virtual cache entry corresponds to the virtual address range in the break point register(s), in response to a new executing (second) data access demand to the cache line or entry in the virtual cache marked with the indicator bit, the cache hit is blocked, e.g., the data is not released, but the processor knows that there is a partial break point register match/detection, and the executing data access demand enters a slow mode. The executing data access demand is marked as having partially matched the break point register (s). In this slow mode, the executing data access demand is taken outside the critical path of the processor to perform the full break point register compare. In one or more embodiments, a full comparison can be performed to the virtual address range in the break point register(s), or in an aspect, only the bits that were not compared as part of the virtual cache comparison may be compared. If the (full) compare does not match the data in the break point register(s), then the executing data access demand re-accesses the cache, the indicator bit tag is ignored, and the cache is marked as having fully processed the break point register. If the (full) compare does match the break point register data, then the executing data access demand does not re-access the virtual cache and instead the virtual cache is flagged and treated as an exception, and the program stops executing.

When the contents of a breakpoint register changes, the indicator tag bits in the virtual cache become stale. In this scenario, the virtual cache invalidates any stale bits, e.g., the previous virtual address of the point break register. This can be performed by invalidating individual cache line entries that are improperly tagged in the virtual cache, or over invalidation can be performed where the entire virtual cache contents can be invalidated.

Figure 3A:
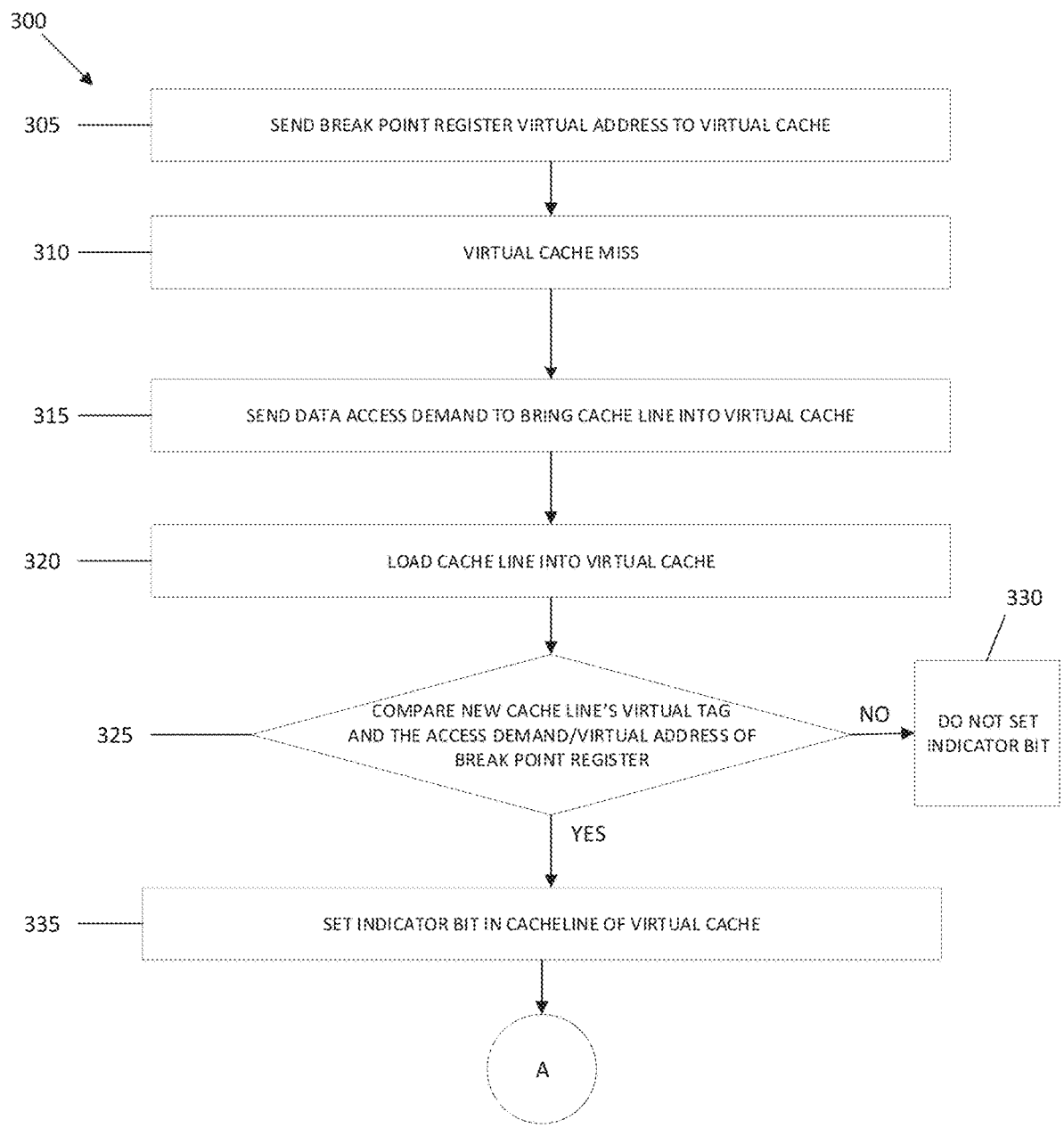
FIGS. 3A and 3B set forth an exemplary flowchart illustrating and describing a method and system of setting up and using a virtual cache as part of a break point or interrupt mechanism to stop a program's execution.
Figure 3B:
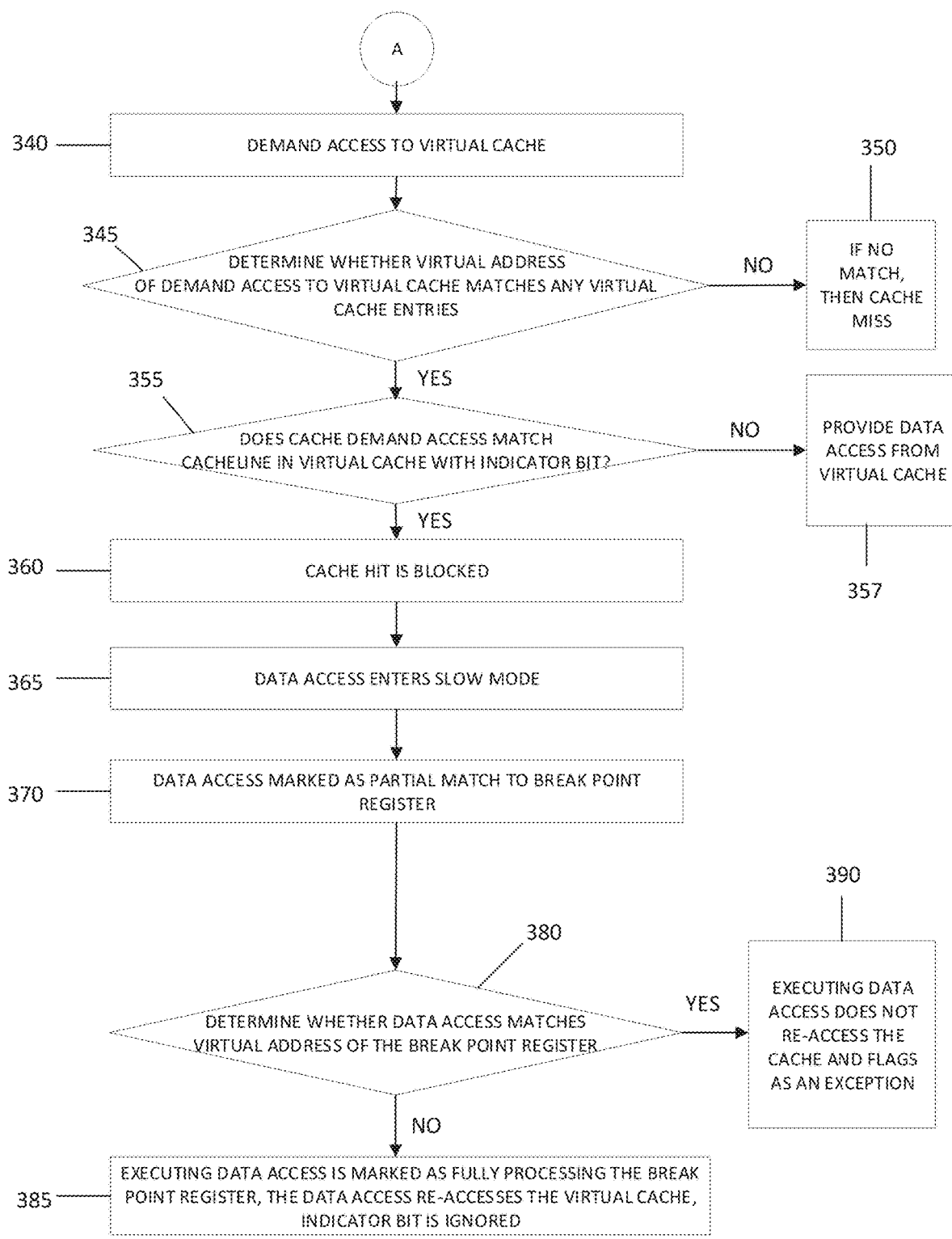

FIGS. 3A and 3B set forth exemplary flowcharts in accordance with one or more embodiments illustrating and describing a method and system of a break point mechanism, including using a virtual cache as part of a break point or interrupter mechanism to stop a program and/or processor from executing. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 3A and 3B, but the process may be integrated and/or one or more steps may be performed together, simultaneously, or the steps may be performed in the order disclosed or in an alternate order.

In a first aspect of method 300 shown in FIG. 3A a break point or interruption mechanism is set up and enabled, and includes in one or more embodiments of using a virtual cache, and in an aspect tagging an indicator bit in an entry of a virtual cache where the virtual address of the entry corresponds to a virtual address range in one or more break point register(s). In an embodiment, at 305 the contents of a break point register, e.g., the virtual address range in the break point register, is sent to the virtual cache, preferably a virtually tagged cache. That is, at 305, a first access demand, preferably a data access demand, is made to the virtual cache using the virtual address range in at least one of the break point register(s). Since at this point the virtual address range in the at least one of the break point registers is not in the virtual cache there should be a cache miss at 310. In response to the virtual cache miss at 310, the first access demand is sent to bring the missed cache line into an entry in the virtual cache at 315. In one or more embodiment, the first data access demand is sent to memory to retrieve the missing data (cacheline). In one or more embodiments, reloading the cacheline (entry) in the virtual cache is performed outside the processor's critical or main path.

At 320, the missing cache line corresponding to (matching) the first data access demand is loaded and/or reloaded into an entry in the virtual cache. In response to the missing cache line being loaded/reloaded into one of the entries in the virtual cache, a comparison is performed at 325 to determine whether the virtual tag of the new cache line added to the virtual cache entry (e.g., the virtual address tag of the first data access demand) is equal to or matches the virtual address range of at least one of the break point registers. If there is not a match between the virtual tag of the new cache line added to the virtual cache entry and the virtual address range of at least one of the break point registers (325:No), then at 330 the indicator bit for that entry is not set. If there is a match between the virtual tag of the new cache line (the virtual address of the data access demand) and the contents (e.g., the virtual address range) in at least one of the break point registers (325:Yes), then at 335 the indicator bit is set for the new cache line (entry) added to the virtual cache. At this point, the virtual cache has been primed and the break point mechanism in an embodiment is set and/or enabled for the virtual address of that break point register.

As indicated above, most modern computer systems will handle multiple threads and may employ multiple break point registers to aid in program monitoring. It is not uncommon to have 4, 8, or more break point registers to aid program monitoring including demand load and store operations simultaneously. In one or more embodiments, a unique indicator bit for one or more, and in an aspect each of these break point registers could be employed, but, in an aspect, employing a plurality of indicator bits may be more than desirable and could in circumstance be inefficient. In an aspect, the plurality of indicator bits that might be generated from the processes 325 and 335 for the plurality of break point registers are combined into a single indicator bit, effectively OR'ing the indicator bit to on if any one of the program break point registers indicate that the indicator bit should be on. If the initial comparison in the virtual cache is robust enough, then the possible threat of degrading performance of one thread that may require the indicator bit to be set to on against another thread that may require the indicator bit to be off, for any given cache line, would be small.

The method 300 continues in the flow chart of FIG. 3B where the operation of the break point mechanism, and use of the primed and enabled virtual cache are described. At 340 there will be a second access demand, preferably a data access demand, to the virtual cache. In response to the second access demand to the virtual cache, there will be a comparison at 345 between the second access demand and the entries (cache lines) in the virtual cache to see if there is a match (hit) in the virtual cache. If the access demand is to a virtual address that is not present in the virtual cache (345:No), e.g., there is no matching entry detected by the comparison in virtual cache at 345, then at 350 there is a virtual cache miss and the processor will need to bring the corresponding cache line into an entry in the virtual cache. If the second access demand is to a cache line (entry) in the virtual cache (345:Yes), then the process 300 continues to 355 where it is determined whether the matching entry in the virtual cache has been tagged with the indicator bit. If the second access demand does not match the virtual cache entry tagged with the indicator bit (355:No), then at 357 the data from the matching virtual cache entry is written back/ provided. Since the virtual cache has been enabled or primed, if the second access demand does match the entry tagged with the indicator bit (355:Yes), then a break point checking mechanism is triggered and the process 300 continues to 360.

At 360, in response to the second data access matching the tagged virtual cache entry, the second data access demand hit in the virtual cache in an embodiment is blocked and the data is not written back to a register. In response to the second data access matching the virtual cache entry tagged with the indicator bit, the processor, particularly the executing second data access demand, in an embodiment enters a slow mode at 365. The executing second data access demand to the virtual cache, in response to matching the tagged virtual cache entry, in an embodiment, is also marked at 370 as a partial match to the break point register(s).

The method 300 of detecting whether there is a break point exception continues at 380, where in the slow mode, and preferably outside the critical path of the processor, a further comparison is undertaken at 380 to determine whether the executing data access matches the virtual address of the break point register(s). In one or more embodiments, a full comparison can be performed between the breakpoint virtual address(es) and the executing data access, or in an aspect, a comparison of the bits not yet compared by the virtual cache comparators can be undertaken. Other means of preforming the comparison are contemplated.

If the (full) comparison of the executing data access and the virtual address(es) of the break point register(s) do not match (380:No), then at 385, in one or more embodiments, the executing data access is marked as fully processing the break point register(s), and/or in an aspect the executing second data access demand re-accesses the virtual cache, and/or in a further aspect the indicator bit in the virtual cache entry is ignored. If the full comparison of the break point register(s) is a match (380:Yes), then at 390, one or more embodiments, the executing second data access demand does not re-access the virtual cache, but rather the executing data access is flagged as an exception, and in an embodiment the program and/or processor stops executing.

In one or more examples, a mechanism has been disclosed to detect when a data memory access matches contents of one or more break point register(s), where a virtual cache has been used in conjunction with one or more indicator bits added to a cache line (entry) in the virtual cache to identify whether a partial break point match occurred when accessing the virtual cache. The comparisons performed as part of the break point or interrupter mechanism preferably take place outside a critical function path of the processor such that processor performance loss is negligible.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 3A and 3B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of stopping program execution comprising, by a processing system:

providing a virtual address range from a break point register to a virtual cache;

loading a cacheline into a virtual cache entry in the virtual cache corresponding to the virtual address range from the break point register:
  in response to loading a cacheline in a virtual cache entry in the virtual cache, determining if the cacheline loaded into the virtual cache entry contains the virtual address range from the break point register;
  in response to determining that the cacheline loaded into the virtual cache entry contains the virtual address range from the breakpoint register, tagging the corresponding virtual cache entry in the virtual cache with an indicator bit to indicate that the virtual cache entry corresponds to the virtual address range in the break point register;
  making a new data access demand to the virtual cache;
  determining whether the new virtual cache data access demand matches an entry in the virtual cache;
  in response to the new virtual cache data access demand matching a virtual cache entry tagged with the indicator bit, determining whether the new virtual cache data access demand matches the virtual address range in the breakpoint register; and
  in response to the new virtual cache data access demand matching the virtual address range in the break point register, flagging an exception and stopping execution of the program.

2. The method of claim 1, wherein loading a cacheline into a virtual cache entry in the virtual cache corresponding to the virtual address range from the break point register comprises making a first data access demand to the virtual cache with the virtual address range in the break point register.

3. The method of claim 2, wherein in response to making a first data access demand to the virtual cache with the virtual address range in the break point register, the virtual cache misses and the first data access demand is sent to bring and load the cacheline corresponding to the virtual address range in the break point register into the virtual cache.

4. The method of claim 3, wherein determining if the cacheline loaded into the virtual cache entry contains the virtual address range from the breakpoint register comprises, performing a comparison to determine whether the cacheline loaded to the virtual cache entry contains the virtual address range in the break point register.

5. The method of claim 1, further comprising, in response to the new data access demand matching a virtual cache entry tagged with the indicator bit, marking the new data access demand as at least partially matching the virtual address range in the break point register.

6. The method of claim 1, wherein, in response to the new data access demand matching a virtual cache entry tagged with the indicator bit, the virtual cache data is not written to a register.

7. The method of claim 1, wherein, in response to the new data access demand matching the virtual cache entry with the indicator bit, the new data access demand enters a slow mode to determine whether the new virtual cache data access demand matches the virtual address range in the breakpoint register.

8. The method of claim 7, further comprising, in response to entering the slow mode, the new data access demand is taken outside the critical path of the processor.

9. The method of claim 7, further comprising, while in the slow mode, performing a full comparison between the new data access demand and the virtual address range in the break point register.

10. The method of claim 9, further comprising, in response to the new data access demand fully matching the virtual address in the point break register, the new data access demand does not re-access the virtual cache, and flags the new data access demand as an exception and stops executing the program.

11. The method of claim 9, further comprising, in response to the new data access demand not fully matching the virtual address in the break point register, the new data access demand re-accesses the indicator bit tagged entry in the virtual cache and ignores the indicator bit.

12. A computing system comprising:
  a virtual cache having a plurality of entries having a virtually tagged address and associated data;
  a breakpoint register containing a virtual address range; and
  a processor;
  wherein the system is configured to:
  load a cacheline into a virtual cache entry in the virtual cache corresponding to the virtual address range in the break point register:
    in response to loading a cacheline into a virtual cache entry in the virtual cache, determine if the cacheline loaded into the virtual cache entry contains the virtual address range from the break point register;
    in response to determining that the cacheline loaded into the virtual cache entry contains the virtual address range from the breakpoint register, tag that corresponding virtual cache entry with an indicator bit to indicate that the virtual cache entry corresponds to the virtual address range in a break point register;
    in response to a virtual cache data access demand matching the entry tagged with the indicator bit, determine whether the data access demand matches the virtual address range in the breakpoint register; and
    in response to the data access demand matching the virtual address range in the break point register, flag an exception and stop the execution of the program.

13. The system of claim 12, wherein the system is further configured to make a first data access demand to the virtual cache with the virtual address range in the break point register.

14. The system of claim 12, wherein determining if the cacheline loaded into the virtual cache entry contains the virtual address range of the breakpoint register comprises: performing a comparison to determine whether the cacheline loaded into the virtual cache entry contains the virtual address range in the break point register, and in response to the cacheline containing the virtual address range in the break point register, tag the indicator bit for that virtual cache entry.

15. The system of claim 12, wherein the system is further configured to block the virtual cache hit and not write the data to a register in response to the data access demand matching the virtual address range in the break point register.

16. The system of claim 12, wherein the system is further configured to enter a slow mode in response to the data access demand matching the virtual cache entry with the indicator bit, and, while in the slow mode, perform a full comparison between the data access demand and the virtual address range in the break point register.

17. A computing system comprising:
  a virtual cache having a plurality of entries, wherein each entry has a virtually tagged address and associated data;
  a breakpoint register containing a virtual address range;
  a processor; and a non-transitory computer-readable storage medium comprising program instructions that when executed by the processor cause the processor to:

load a cacheline into a virtual cache entry in the virtual cache corresponding to the virtual address range from the break point register;

in response to loading a cacheline in a virtual cache entry in the virtual cache, determine if the cacheline loaded into the virtual cache entry contains the virtual address range from the break point register;

in response to determining that the cacheline loaded into the virtual cache entry contains the virtual address range from the breakpoint register, tag that corresponding virtual cache entry with an indicator bit to indicate that the virtual cache entry corresponds to the virtual address range in a break point register;

in response to a second virtual cache data access demand matching the entry tagged with the indicator bit, determine whether the second data access demand matches the virtual address range in the breakpoint register; and in response to the second data access demand matching the virtual address range in the break point register, flag an exception and stop the execution of the program.

18. The system of claim 17, wherein tagging a virtual cache entry with an indicator bit comprises program instructions that when executed by a processor cause the processor to:

perform a comparison to determine whether the cacheline loaded into a virtual cache entry contains the virtual address range in the break point register, and in response to the first data access demand containing the virtual address range in the break point register, tagging the indicator bit for that virtual cache entry; and the system further comprises programming instructions that when executed by a processor cause the processor to:

enter a slow-mode in response to the second data access demand matching the virtual cache entry with the indicator bit; and perform, while in slow-mode, a full comparison between the second data access demand and the virtual address range in the break point register.

* * * * *